(12) United States Patent
L'Heureux et al.

(10) Patent No.: US 12,164,016 B2
(45) Date of Patent: Dec. 10, 2024

(54) INTERIOR POSITIONING SYSTEM FOR TRACKING COMMUNICATION DEVICES WITHIN A REMOTE LOCATION, AND METHOD THEREFORE

(71) Applicant: SOLUTIONS AMBRA INC., Trois-Rivières (CA)

(72) Inventors: Eric L'Heureux, Trois-Rivières (CA); Alex Leveillee, Maskinongé (CA)

(73) Assignee: SOLUTIONS AMBRA INC.

( * ) Notice: Subject to any disclaimer, the term of this patent is extended or adjusted under 35 U.S.C. 154(b) by 344 days.

(21) Appl. No.: 17/639,487

(22) PCT Filed: Sep. 1, 2020

(86) PCT No.: PCT/CA2020/051193
§ 371 (c)(1),
(2) Date: Mar. 1, 2022

(87) PCT Pub. No.: WO2021/042207
PCT Pub. Date: Mar. 11, 2021

(65) Prior Publication Data
US 2022/0308149 A1    Sep. 29, 2022

Related U.S. Application Data

(60) Provisional application No. 62/895,027, filed on Sep. 3, 2019.

(51) Int. Cl.
*G01S 1/68* (2006.01)
*G01S 1/04* (2006.01)
(Continued)

(52) U.S. Cl.
CPC .............. *G01S 1/0423* (2019.08); *G01S 1/68* (2013.01); *G01S 5/0295* (2020.05); *E21F 17/18* (2013.01); *H04W 4/029* (2018.02)

(58) Field of Classification Search
CPC ......... G01S 1/0423; G01S 1/68; G01S 5/0295
(Continued)

(56) References Cited

U.S. PATENT DOCUMENTS

| 4,972,505 A | 11/1990 | Isberg |
| 7,616,968 B2 | 11/2009 | Waye |

(Continued)

FOREIGN PATENT DOCUMENTS

| KR | 20180057389 A | 5/2018 | |
| TW | 201020575 A * | 6/2010 | ........... G01C 22/006 |

(Continued)

OTHER PUBLICATIONS

The National Institute for Occupational Safety and Health (NIOSH), CDC-Mining- Basic Wireless Communication and Electronic Tracking Tutorial-NIOSH. https://web.archive.org/web/20190619195830/https://www.cdc.gov/niosh/mining/content/emergencymanagementandresponse/commtracking/commtrackingtutorial1.html.

(Continued)

Primary Examiner — Harry K Liu
(74) Attorney, Agent, or Firm — Reno Lessard; Norton Rose Fulbright Canada LLP

(57) ABSTRACT

There is described an interior positioning system for tracking spatial position of communication devices within a remote location. The interior positioning system generally has: a radio frequency network distributed through said remote location; beacons spaced-apart from one another throughout said remote location and powered by said radio frequency network, each beacon locally emitting a corresponding beacon identifier which when received by a nearby communication device is communicated over said radio frequency network by said communication device; and a tracking controller being communicatively coupled to said (Continued)

radio frequency network, said tracking controller stored thereon tracking data associating each of said beacon identifiers to respective spatial coordinates, and instructions that when executed perform the steps of: receiving said beacon identifier communicated over said radio frequency network by said communication device, and determining spatial coordinates of said communication device by cross referencing said received beacon identifier to said tracking data.

22 Claims, 12 Drawing Sheets

(51) Int. Cl.
  *G01S 5/02* (2010.01)
  *E21F 17/18* (2006.01)
  *H04W 4/029* (2018.01)
(58) Field of Classification Search
  USPC .......................................................... 342/451
  See application file for complete search history.

(56) References Cited

U.S. PATENT DOCUMENTS

| | | | |
|---|---|---|---|
| 8,294,568 | B2 | 10/2012 | Barrett |
| 9,660,698 | B2 | 5/2017 | Derneryd et al. |
| 10,028,105 | B1 | 7/2018 | Swart |
| 10,231,078 | B1 | 3/2019 | Swart |
| 11,356,501 | B1* | 6/2022 | Hashisho ............... G08G 5/025 |
| 2009/0085741 | A1 | 4/2009 | Ravi et al. |
| 2010/0073235 | A1* | 3/2010 | Smith ..................... H04W 4/33 |
| | | | 342/451 |
| 2014/0274119 | A1* | 9/2014 | Venkatraman ........ H04W 64/00 |
| | | | 455/456.1 |
| 2016/0183042 | A1 | 6/2016 | Weizman et al. |
| 2016/0207637 | A1 | 7/2016 | Campillo et al. |
| 2017/0006424 | A1 | 1/2017 | Liin et al. |
| 2017/0215041 | A1* | 7/2017 | Liu ............................ G01S 1/68 |
| 2019/0229768 | A1 | 7/2019 | Jeremy et al. |

FOREIGN PATENT DOCUMENTS

| | | |
|---|---|---|
| WO | 2011063053 A3 | 5/2011 |
| WO | 2018049406 A1 | 3/2018 |
| WO | 2018094520 A1 | 5/2018 |
| WO | 2020087186 A1 | 5/2020 |

OTHER PUBLICATIONS

Private LTE Solutions, Ambra Solutions iPS (Intelligent Positioning System).

* cited by examiner

INTERIOR POSITIONING SYSTEM FOR TRACKING COMMUNICATION DEVICES WITHIN A REMOTE LOCATION, AND METHOD THEREFORE

FIELD

The improvements generally relate to tracking position(s) of one or more communication devices within a remote location, and more particularly relate to the tracking of communication device(s) moving within a location where traditional wireless network signals and GPS signals are not accessible.

BACKGROUND

Tracking the position of a communication device, such as a smartphone, an electronic tablet and the like, moving within an underground mine, an isolated plant, a building interior and any other remote location is useful not only to track the communication device itself but also track an operator, a vehicle or a piece of equipment carrying the communication device. As such, in case of an incident within the remote location, interior positioning systems are used to retrieve which communication devices were positioned near the incident, which is of great interest should an operator be rescued, for instance. Such communication device tracking presents challenges as traditional wireless network signals and GPS signals may not be as reliable in such remote locations as they would be in the outside world. Although existing systems for tracking communication devices within a remote location are satisfactory to a certain degree, there remains room for improvement, especially in facilitating the maintenance of such systems and/or avoiding battery-related issues.

SUMMARY

It was found that there is a need in the industry to provide an interior positioning system which maintenance is facilitated and/or does not rely on battery-powered beacons.

In some aspects of the present disclosure, there are described an interior positioning system and method for tracking spatial position of communication devices within a remote location. The interior positioning system has a radio frequency network distributed through the remote location, beacons spaced-apart from one another throughout the remote location and along the radio frequency network, and a tracking controller communicatively coupled to the radio frequency network. Each of the beacons locally emits a corresponding identifier which when received by a nearby communication device is communicated over the radio frequency network by the communication device. The tracking controller has access to tracking data associating each of said identifiers to respective spatial coordinates. As such, the tracking controller can receive the identifier communicated over the radio frequency network by the communication device, and determine spatial coordinates of the communication device by cross referencing the received identifier to the tracking data. It was found convenient to power the beacons by the radio frequency network. As a result, maintenance of the interior positioning system is facilitated and its reliability is increased as the risk of having a battery-related failure close to an incident is greatly reduced.

In accordance with a first aspect of the present disclosure, there is provided an interior positioning system for tracking spatial position of communication devices within a remote location, the interior positioning system comprising: a radio frequency network distributed through said remote location; a plurality of beacons spaced-apart from one another throughout said remote location and powered by said radio frequency network, each of said beacons locally emitting a corresponding beacon identifier which when received by a nearby communication device is communicated over said radio frequency network by said communication device; and a tracking controller being communicatively coupled to said radio frequency network, said tracking controller having a processor and a memory having stored thereon tracking data associating each of said beacon identifiers to respective spatial coordinates, and instructions that when executed by said processor perform the steps of: receiving said beacon identifier communicated over said radio frequency network by said communication device, and determining spatial coordinates of said communication device by cross referencing said received beacon identifier to said tracking data.

Further in accordance with the first aspect of the present disclosure, said beacons can for example be battery-less.

Still further in accordance with the first aspect of the present disclosure, said radio frequency network can for example have a communication link carrying a communication signal, and a powering link supplying electrical power to said beacons.

Still further in accordance with the first aspect of the present disclosure, said powering link can for example include a power injector injecting said electrical power to said communication signal.

Still further in accordance with the first aspect of the present disclosure, said power injector can for example inject a direct current power supplying component to said communication signal.

Still further in accordance with the first aspect of the present disclosure, said direct current power supplying component can for example include a negative tension.

Still further in accordance with the first aspect of the present disclosure, said negative tension can for example be below at least minus 5 VDC.

Still further in accordance with the first aspect of the present disclosure, at least one of said beacons can for example have a power supplying port for supplying power to at least one of said communication device an external device.

Still further in accordance with the first aspect of the present disclosure, said beacons can for example have an operating software being updatable via said radio frequency network.

Still further in accordance with the first aspect of the present disclosure, said updating can for example be performed by modulating a power supplied by said radio frequency network.

Still further in accordance with the first aspect of the present disclosure, said radio frequency network can for example have a leaky cable interspersed throughout said remote location, each of said beacons being within a radiating range of said leaky cable.

Still further in accordance with the first aspect of the present disclosure, said radio frequency network can for example have a plurality of radio frequency antennas distributed within said remote location, each of said beacons being within a radiating range of at least one of said radio frequency antennas.

Still further in accordance with the first aspect of the present disclosure, at least a given one of said beacons can for example have a processor and a memory having stored thereon instructions that when executed by said process perform the steps of: upon detecting that said given beacon is no longer in communication with said radio frequency network, generating an alert which when received by a nearby communication device is communicated over said radio frequency network by said communication device.

In accordance with a second aspect of the present disclosure, there is provided a method of tracking position of communication devices within a remote location having a radio frequency network distributed therethrough, the method comprising: using a plurality of beacons spaced-apart within said remote location, drawing power from said radio frequency network and, using said drawn power, locally transmitting corresponding beacon identifiers nearby; upon a communication device receiving at least one of said locally transmitted beacon identifiers, communicating said received beacon identifier via said radio frequency network; and using a tracking controller, accessing tracking data associating each of said beacon identifiers to respective spatial coordinates; receiving said beacon identifier communicated over said radio frequency network by said communication device; and determining spatial coordinates of said communication device by cross referencing said received beacon identifier to said tracking data.

Further in accordance with the second aspect of the present disclosure, said radio frequency network can for example communicate with said beacons by modulating said power.

Still further in accordance with the second aspect of the present disclosure, said radio frequency network can for example have a communication signal and a powering signal superposed to said communication signal.

Still further in accordance with the second aspect of the present disclosure, said powering signal can for example include a direct current power supplying component, said direct current power supplying component having a negative tension.

Still further in accordance with the second aspect of the present disclosure, the method can for example further comprise, upon detecting that a given one of said beacons is no longer in communication with said radio frequency network, generating an alert which when received by a nearby communication device is communicated over said radio frequency network by said communication device.

Still further in accordance with the second aspect of the present disclosure, upon communicating said received beacon identifier via said radio frequency network, said communication device can for example further communicate a device identifier identifying said communication.

Still further in accordance with the second aspect of the present disclosure, upon communicating said received beacon identifier via said radio frequency network, said communication device can for example further communicate sensor data indicative of data generated by a sensor of at least one of said communication device and an external device communicatively coupled to said communication device.

Many further features and combinations thereof concerning the present improvements will appear to those skilled in the art following a reading of the instant disclosure.

DESCRIPTION OF THE FIGURES

In the figures.

DETAILED DESCRIPTION

Figure 1:
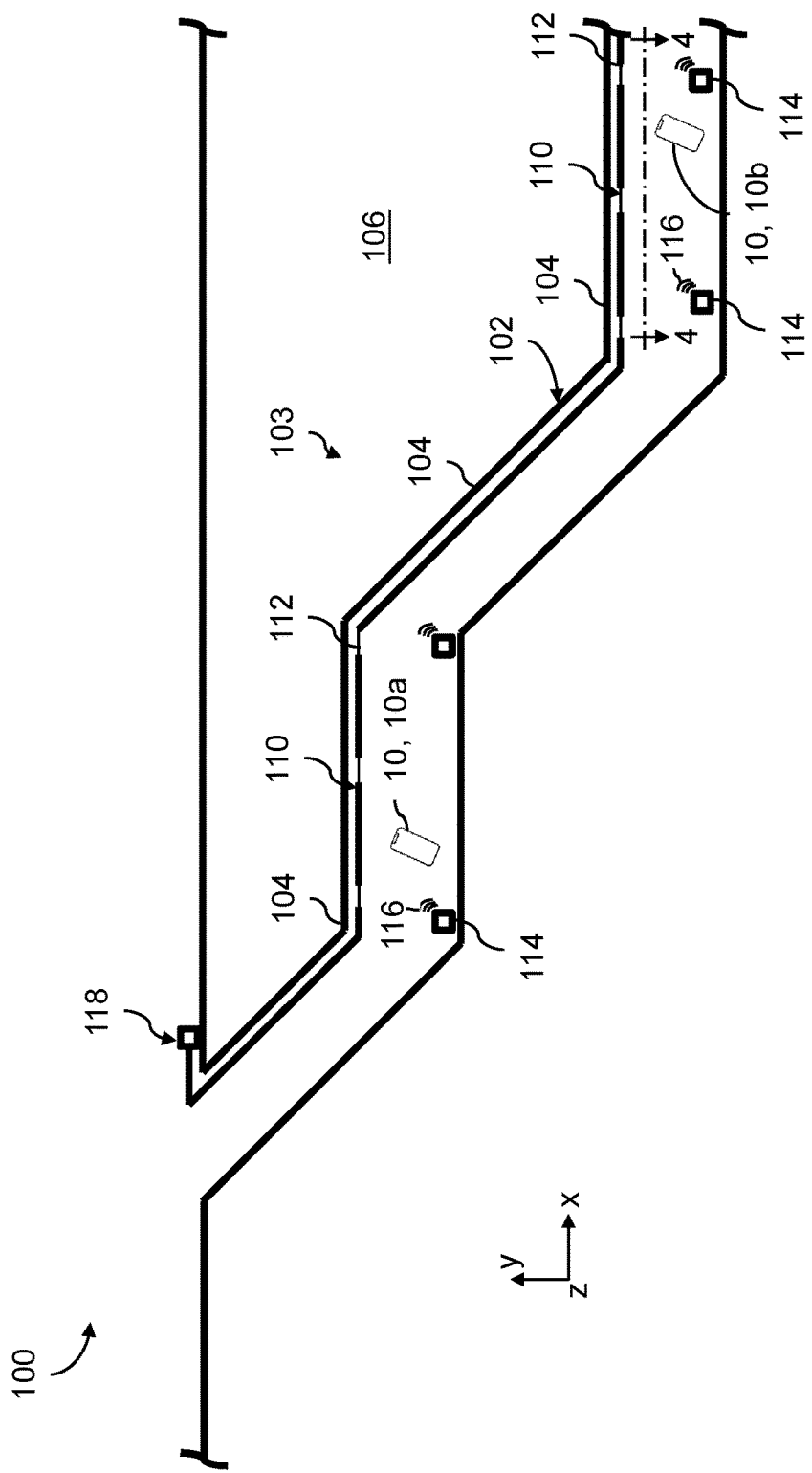
FIG. 1 is schematic view of an example of an interior positioning system for tracking spatial positions of communication devices within a remote location, showing a tracking controller, a radio frequency network and beacons, in accordance with one or more embodiments.

FIG. 1 shows an example of an interior positioning system 100 for tracking spatial position of communication devices 10 within a remote location 102. As depicted in this specific embodiment, the remote location 102 is provided in the form of an underground mining infrastructure 103, including tunnel(s) 104 at different depth(s) within the ground 106. However, in some other embodiments, the remote location 102 can be provided in the form of any other remote location having limited access to traditional wireless network signals and/or GPS signals such as isolated plants, building interiors, airports and the like.

The communication devices 10 to be tracked can vary depending on the embodiment. For instance, the communication devices 10 may be provided in the form of a smart phone 10a, an electronic tablet 10b, an electronic watch, a modem, a device having one or more communication interfaces (e.g., a LTE communication interface, a Bluetooth Low Energy (BLE) communication interface) and the like. In some embodiments, the communication devices 10 are dedicated devices which are to be part of wearable devices such as helmets, cap lamps, gloves, or other types of body-worn garments. In some other embodiment, the communication devices 10 are mountable to assets such as vehicles, tool boxes and the like, which can allow to track costly and/or useful assets within the remote location 102.

As shown, the interior positioning system 100 has a radio frequency network 110 distributed through the remote location 102. In some embodiments, the radio frequency network 110 is an Long-Term Evolution (LTE) cable network. Examples of a radio frequency network 110 can include, but not limited to, a cellular communication network of the first generation (1G), a cellular communication network of the second generation (2G), a cellular communication network of the third generation (3G), a cellular communication network of the fourth generation (4G), a cellular communication network of the fifth generation (5G) and any following cellular communication network generations. The radio frequency network 110 can be operated within any suitable frequency band including, but not limited to, any suitable 3GPP defined LTE band and the like. In this specific embodiment, the radio frequency network has one or more leaky cables 112 interspersed throughout the remote location 102. As depicted, the leaky cable 112 can include a coaxial cable with gaps in its outer conductor to allow radio signals to leak in or out of the cable along at least a portion of its length. The leaky cables 112 may be removably or permanently attached to roof portions, wall portions and/or floor portions of the tunnels depending on the embodiment.

The interior positioning system 100 has a plurality of beacons 114 which are spaced-apart from one another throughout the remote location 102 and powered by the radio frequency network 110. As such, in some embodiments, the beacons 114 are battery-less. Each beacon 114 locally emits a corresponding beacon identifier 116 which when received by a nearby communication device 10 is communicated over the radio frequency network 110 by the communication device 10. The beacon identifier 116 can be communicated via a radio frequency signal in some embodiments. In some other embodiments, the beacon identifier 116 can be communicated via a wireless signal such as a BLE signal. Wi-Fi may also be used for this type of communication in some alternate embodiments. In some alternate embodiments, the beacon identifier 116 can be wiredly communicated to the communication device 10 upon connecting a cable between the beacon 114 and the communication device 10. In these embodiments, the beacon identifier 115 can be communicated by modulating power supplied via one of its power supplying ports. The communication devices 10 may have hardware and/or software implementations configured to allow the communication devices 10 to communicate, unidirectionally or bi-directionally, with any one of the beacons 114. For instance, in embodiments where the communication device 10 is provided in the form of a smartphone 10a, the communication may be facilitated via a downloadable software application. As depicted in this embodiment, each of the beacons 114 are within a radiating range of the leaky cables 112 to communicate therewith.

As illustrated, the interior positioning system 100 has a tracking controller 118 which is communicatively coupled to the radio frequency network 102. The tracking controller 118 has a processor and a memory having stored thereon tracking data associating each of the beacon identifiers 116 to respective spatial coordinates of the remote location 102. The spatial coordinates can be expressed in terms of ($x_i$, $y_i$, $z_i$) coordinates within a given coordinate system (x, y, z) in some embodiments. The spatial coordinates can be expressed in terms of longitude, latitude and altitude coordinates in some other embodiments. Additionally or alternatively, the spatial coordinates can be expressed in terms of sectors, sections, and/or areas of the remote location 102. However, it is noted that any suitable type of spatial coordinates can be used as may be apparent to the skilled reader. The tracking controller 118 can have instructions to receive the beacon identifier 116 communicated over the radio frequency network 110 by the communication device 10, and to determine spatial coordinates of the communication device 10 by cross referencing the received beacon identifier 116 to the tracking data. As will be detailed below, the tracking controller 118 may receive a device identifier along with the beacon identifier 116 so as to identify which one of the communication devices 10 has communicated that beacon identifier 116, which can be convenient when a plurality of communication devices 10 are to be tracked simultaneously or sequentially. It is noted that the tracking controller 118 may receive a timestamp along with the beacon identifier 116 and/or the device identifier so as to identify when the communication device 10 has received and/or communicated that beacon identifier 116, which can in turn enable the tracking of the communication device 10 over time.

The tracking controller 118 can be provided as a combination of hardware and software components. The hardware components can be implemented in the form of a computing device 200, an example of which is described with reference to FIG. 2. Moreover, the software components of the tracking controller 118 can be implemented in the form of a software application implementing method steps, a flow chart 300 showing some of these method steps is described with reference to FIG. 3.

Figure 2:
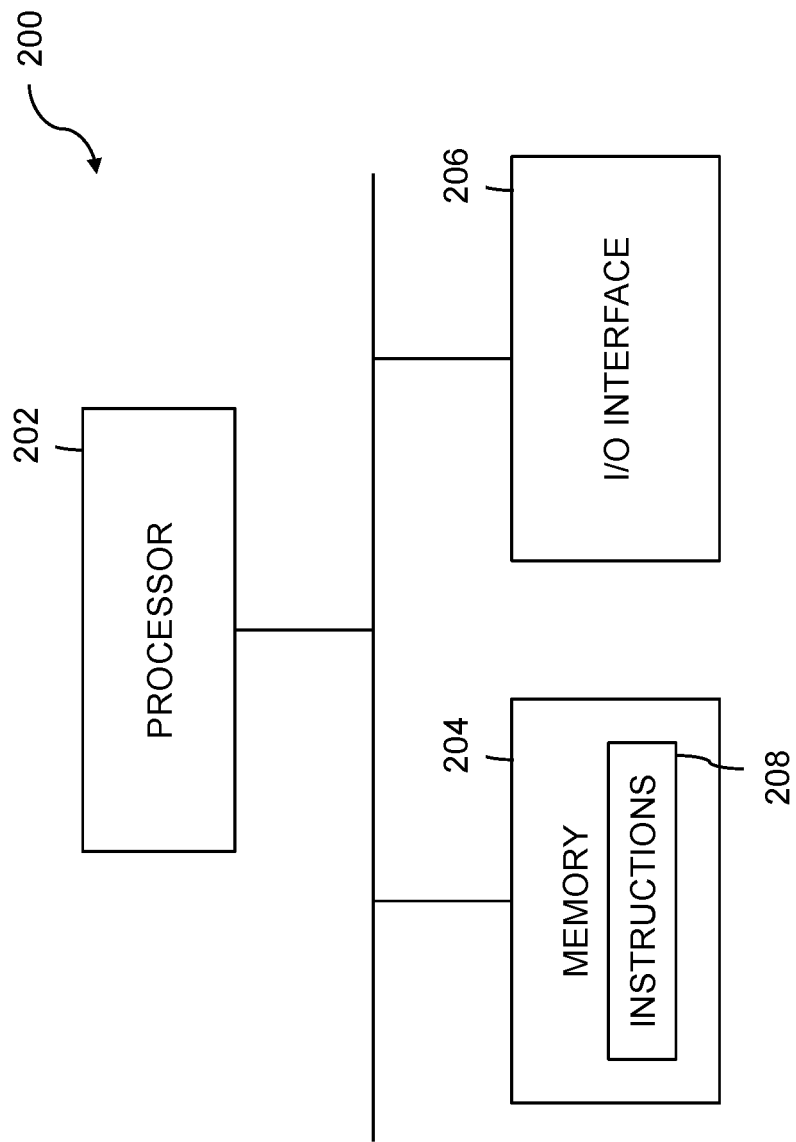
FIG. 2 is a schematic view of an example of a computing device of the tracking controller of FIG. 1, in accordance with one or more embodiments.

Referring to FIG. 2, the computing device 200 can have a processor 202, a memory 204, and I/O interface 206. Instructions 208 for determining the position of one or more communication device can be stored on the memory 204 and accessible by the processor 202.

The processor 202 can be, for example, a general-purpose microprocessor or microcontroller, a digital signal processing (DSP) processor, an integrated circuit, a field programmable gate array (FPGA), a reconfigurable processor, a programmable read-only memory (PROM), or any combination thereof.

The memory 204 can include a suitable combination of any type of computer-readable memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 206 enables the computing device 200 to interconnect with one or more input devices, such as keyboard(s), mouse(s), or with one or more output devices such as display screen(s), memory system(s) and external network(s).

Each I/O interface 206 enables the tracking controller 118 to communicate with other components, to exchange data with other components, to access and connect to network resources, to server applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these. Data hops may be allowed from any network type to another.

The computing device 200 and the software application described herein are meant to be examples only. Other suitable embodiments of the tracking controller 118 can also be provided, as it will be apparent to the skilled reader. For instance, the tracking controller 118 may be provided in the form of a physical server, a virtual server, or a combination of both.

Figure 3:
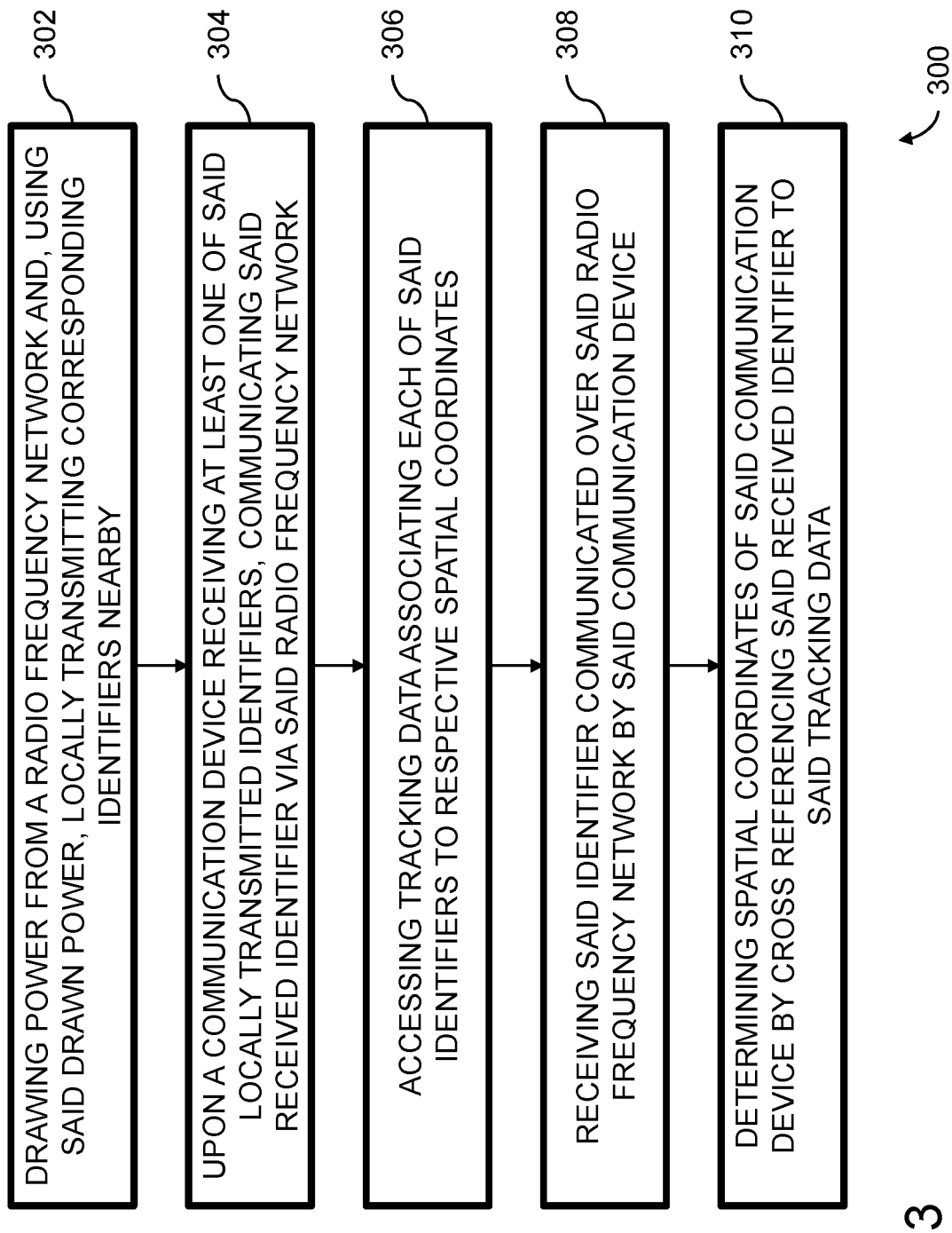
FIG. 3 is a flow chart of an example method of positioning communication devices within a remote location, in accordance with one or more embodiments.

FIG. 3 is a flow chart of an example method 300 of tracking position of communication devices within a remote location with a radio frequency network distributed therethrough. The method 300 is described with reference to the interior positioning system 100 of FIG. 1 for ease of reading.

At step 302, power is drawn from the radio frequency network 110 at a plurality of locations within the remote location 102 and, using the drawn power, beacon identifiers 116 are locally transmitted around each one of these locations. More specifically, each of the beacons 114 draws its power directly from the radio frequency network 110 and emits a corresponding beacon identifier 116 within a given radiating range therearound.

At step 304, upon one of the communication devices 10 receiving at least one of the locally transmitted beacon identifiers 116, the received one of the beacon identifiers 116 is communicated with the radio frequency network 110.

At step 306, the tracking controller 118 accesses tracking data associating each of the beacon identifiers 116 to respective spatial coordinates within the remote location 102.

At step 308, the beacon identifier 116 communicated over the radio frequency network 110 by the communication device 10 in step 304 is received by the tracking controller 118.

At step 310, the tracking controller 118 determines spatial coordinates of the communication device 10 by cross referencing the beacon identifier 116 received at step 308 to the tracking data accessed at step 306.

It is noted that the order in which these steps are performed is exemplary only. For instance, although method 300 shows that step 306 is performed prior to step 308 in this embodiment, step 306 can equivalently be performed after step 308 in some other embodiments. Allowed permutations of the method steps described herein will be apparent to the skilled reader.

In some embodiments, the radio frequency network 100 has a communication link carrying a communication signal and a powering link supplying a power signal. In some embodiments, the power signal supplied by the powering link is superposed to the communication signal. The communication signal can be used to communicate beacon identifiers and device identifiers from the communication device to the tracking controller 118. The communication signal can also be used to carry information from the tracking controller 118 to the beacons 114 and/or to the communication devices 10. For instance, the communication signal can include information used to update firmware or an operating software of at least some of the beacons 114. Additionally or alternatively, information may be carried to the beacons 114 by modulating the power supplied by the powering signal. As such, the powering signal may be used to communicate as well. However, in these embodiments, high speed communication (e.g., using LTE communication protocols) may preferably be performed through the communication link whereas low speed communication may be performed through the powering link.

In some embodiments, the powering signal includes a direct current (DC) power supplying component. It was found convenient to provide the DC power supplying component with a negative tension which may protect portions of the radio frequency network 110, and more specifically its leaky cable 112, from corrosion. The DC power supplying component may be below minus 12 VDC, below minus 24 VDC, or even below minus 48 VDC depending on the embodiment. It is envisaged that the DC power supplying component may range between minus 5 VDC and minus 60 VDC in some embodiments.

In some embodiments, the method 300 includes an optional step in which, upon detecting that a given one of the beacons 114 is no longer in communication with the radio frequency network 110, generating an alert which when received by a nearby communication device 10 is communicated over the radio frequency network 110 by the communication device 10. As such, if it is detected that the radio frequency network 110 has a broken link somewhere, the generated alert can indicate which portion, and preferably between which of the beacons 114, the radio frequency network 110 is in fact damaged or otherwise not functional. Accordingly, such a step can allow rapid and precise maintenance of the radio frequency network 110, when necessary.

Figure 4:
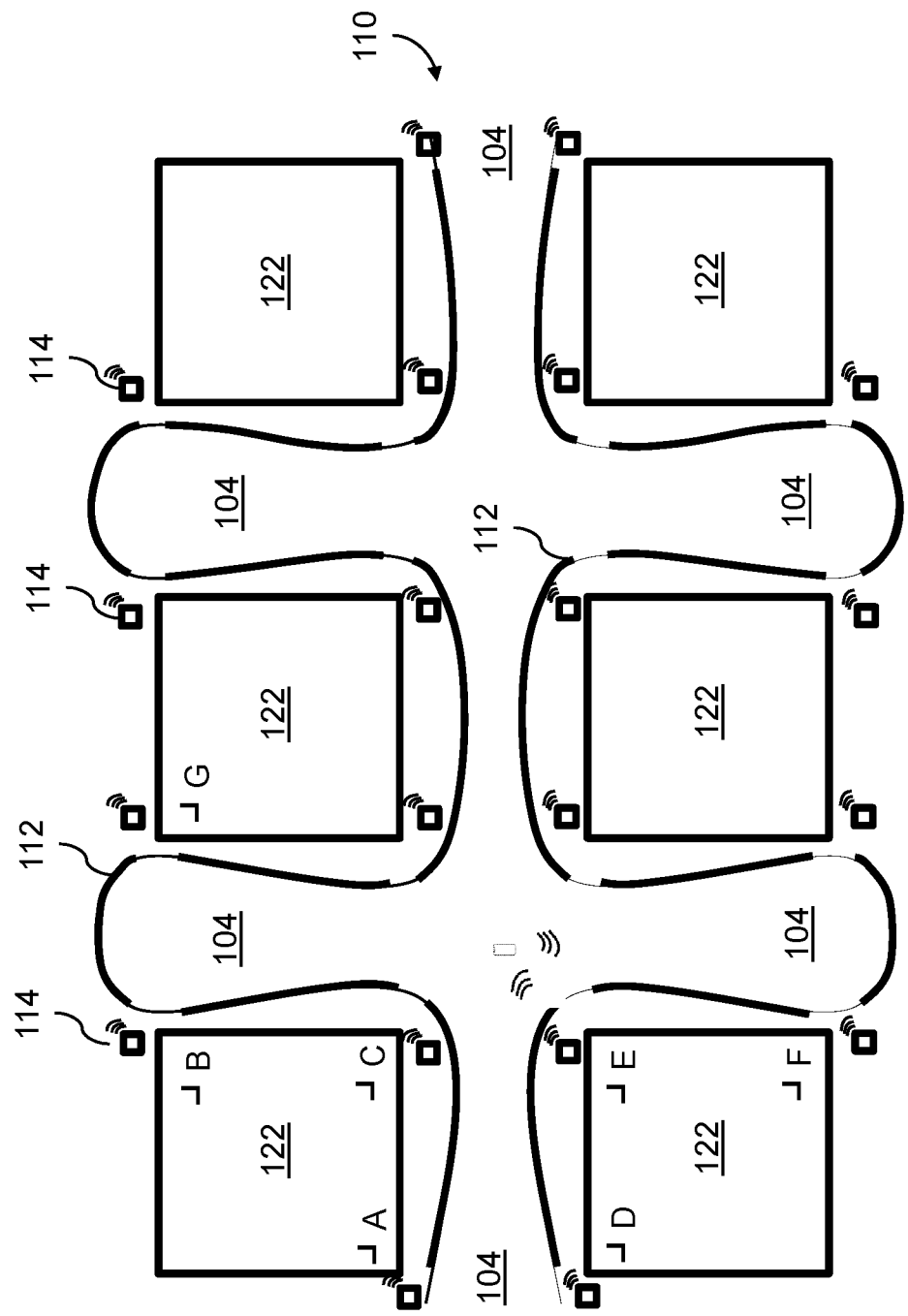
FIG. 4 is a top plan view of the remote location of FIG. 1, taken along line 4-4, in accordance with one or more embodiments.

FIG. 4 shows an example of the underground mining infrastructure 103, taken along section 4-4 of FIG. 1. As shown, this particular level of the underground mining infrastructure 103 is provided in the form of a gallery having a number of tunnels 104 and pillars 122. In this specific embodiment, two leaky cables 112 are interspersed within the tunnels 104 in a manner which cover all tunnel portions with the radio frequency network 110. Also shown in this embodiment are a number of beacons 114 which are strategically positioned on the corners A, B, C, . . . N of the pillars 122.

Figure 5A:
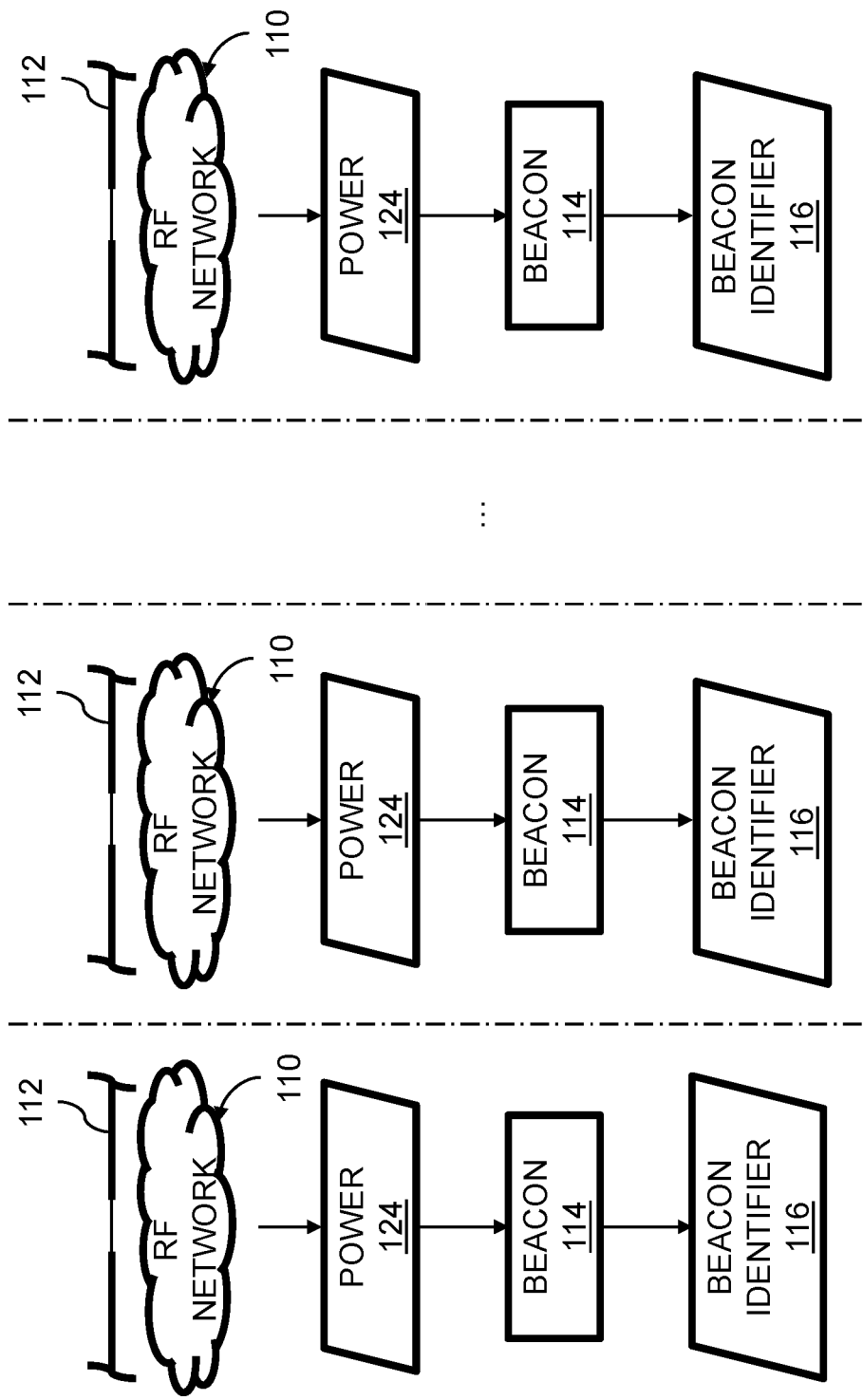
FIG. 5A is a block diagram of a portion of the interior positioning system of FIG. 1, showing beacons being communicatively coupled and powered by the radio frequency network, in accordance with one or more embodiments.

As best shown in FIG. 5A, the beacons 114 are positioned so as to be in range of the radio frequency network 110 in order to draw power 124 from the radio frequency network 110, and more specifically from one of the leaky cables 112, at all times. The so-drawn power 124 is used to locally emit corresponding beacon identifiers 116. For instance, beacon A may transmit beacon identifier A, beacon B may transmit beacon identifier B, and so forth. It is expected that the beacon identifiers 116 are unique with respect to one another, otherwise they would not suitably identify their corresponding beacon 114.

Figure 5B:
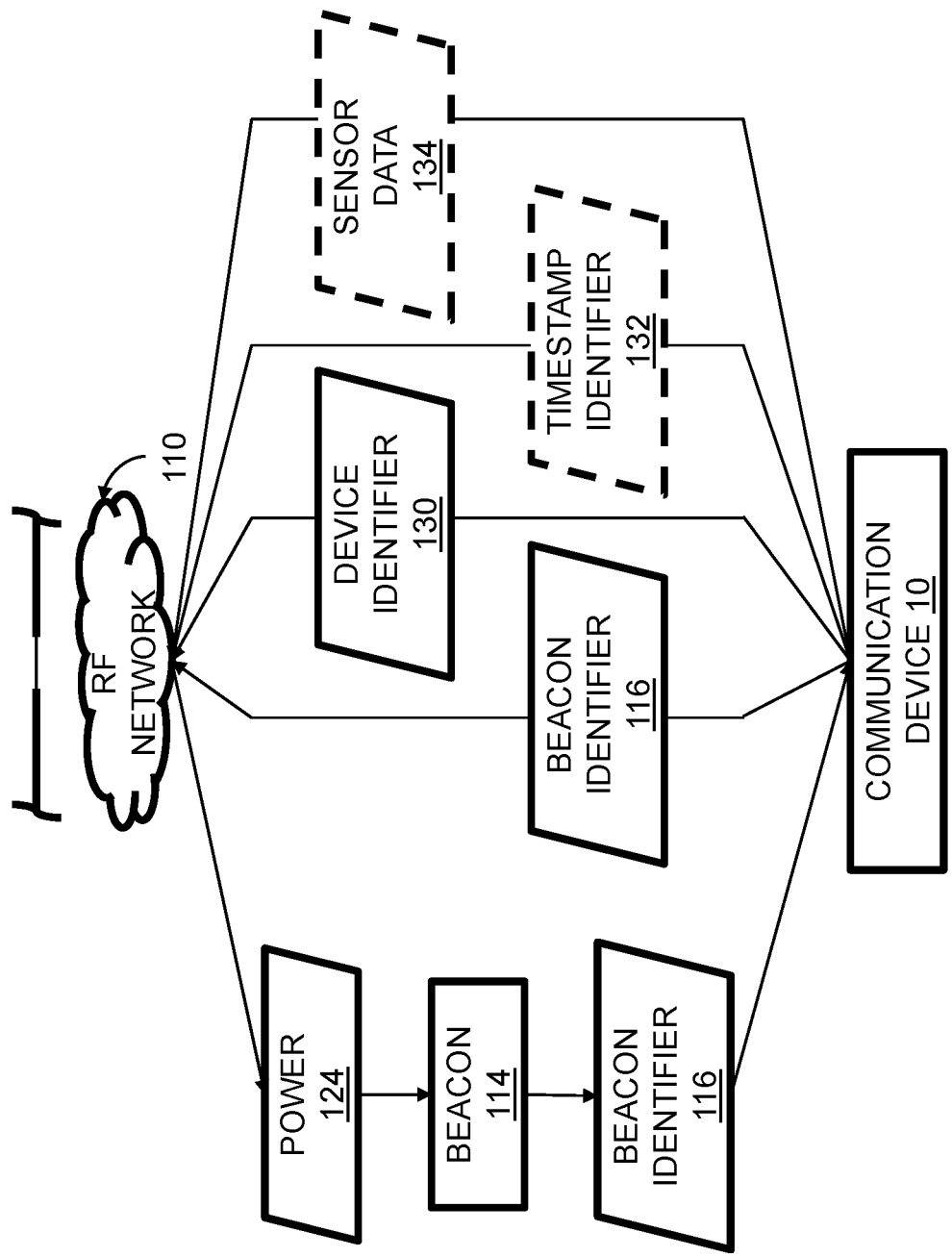
FIG. 5B is a block diagram of another portion of the interior positioning system of FIG. 1, showing a communication device receiving a beacon identifier from one of the beacons of FIG. 5A, in accordance with one or more embodiments.

When a communication device 10 is in close proximity to a given one of the beacons 114, such as shown in FIGS. 4 and 5B, the communication device 10 receives the corresponding beacon identifier 116, in this case the beacon identifier E of the beacon positioned at corner E of the remote location 102, and communicate it over to the tracking controller 118 via the radio frequency network 110. As shown specifically in FIG. 5B, the communication device 100 can communicate a device identifier 130 identifying the communication device 10 as well. Communicating the device identifier 130 may be convenient in situations where a plurality of communication devices 10 are to be tracked at once. It is noted that the communication device 10 may communicate a timestamp identifier 132 along with the beacon identifier 116 and/or the device identifier 130 so that the tracking controller 118 can identify at what time the communication device 10 has received and/or communicated that beacon identifier 116, which can in turn enable the tracking of the communication device 10 over time. In addition, the communication device 10 may communication sensor data 134 along with the other identifiers. The sensor data 134 may include data provided by one or more on-board sensors such as gyroscope(s), accelerometer(s), yaw sensor(s), pressure sensor(s), temperature sensor(s), and the like. In some embodiments, the communication device 10 is in communication with a diagnostic port of an engine control unit (ECU) of a vehicle to retrieve sensor data including instantaneous speed of the vehicle, GPS position and the like. In these embodiments, the diagnostic port of the engine's ECU may be provided in the form of a J1939 port to which the communication device 10 is wiredly connected via a CAN bus link. Such data may be processed to monitor direction, vibration, shock, temperature, surrounding gas content, and any other measurands, associated with the communication device 10 at any time. For example, in an embodiment, accelerometer data can be monitored to track the speed of a truck moving within the remote location 102 for safety purposes. In another embodiment, topography of the remote location 102 may be monitored for maintenance purposes. In some embodiments, the communication device 10 can communicate sensor data originating from one or more sensors of one or more of the beacons 114. For instance, some of the beacons 114 may have sensors monitoring ambient temperature, line voltage or any other suitable measurand, all of which may be communicated to the communication device 10 along with the corresponding beacon identifier 116 for subsequent communication to the radio frequency network 110.

Figure 5C:
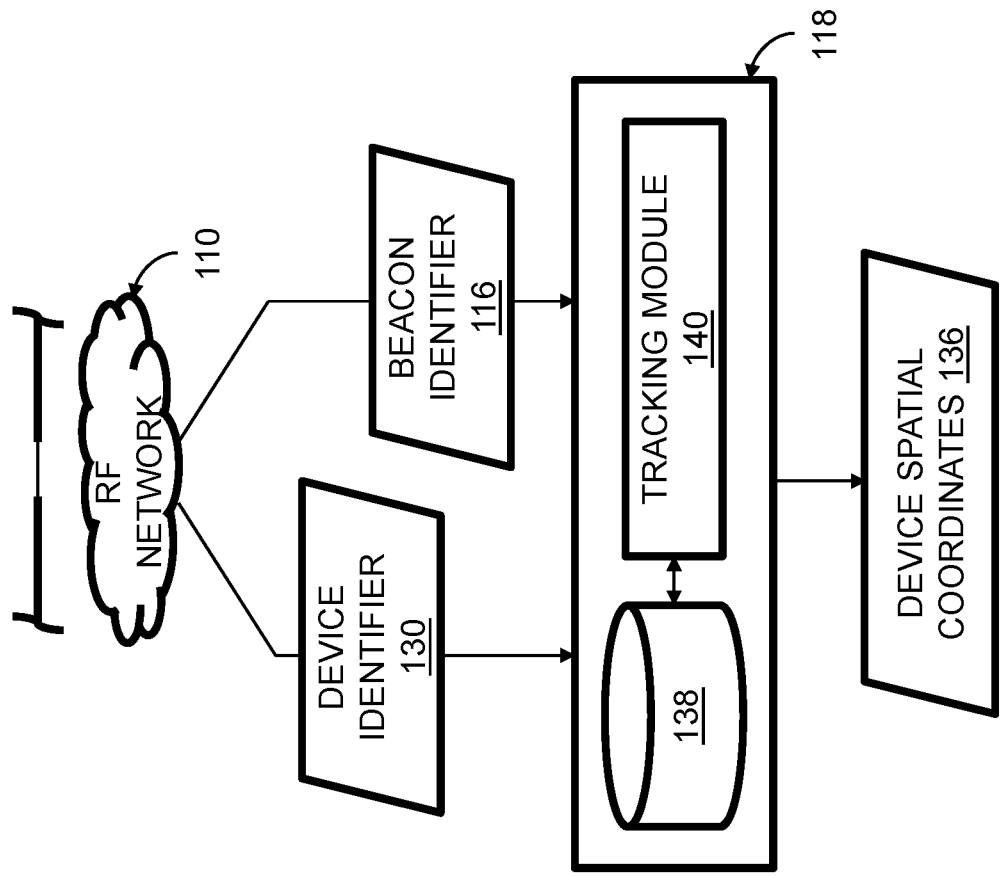
FIG. 5C is a block diagram of another portion of the interior positioning system of FIG. 1, showing the tracking controller receiving the beacon identifier of FIG. 5B and determining the spatial coordinates of the communication device, in accordance with one or more embodiments.

Referring now to FIG. 5C, upon the tracking controller 118 receiving the beacon identifier 116 and the device identifier 130 from the radio frequency network 110, the tracking controller 118 is configured to determine the spatial coordinates 136 of the communication device 10 based on tracking data 138 associating beacon identifiers to a plurality of different spatial coordinates of the remote location 102. Computations within the tracking controller may be performed using a tracking module 140, in some embodiments. Once determined, the device spatial coordinates 136 can be displayed or otherwise shared with a graphical user interface, an open platform communications network, a network operations center or a monitoring system, depending on the embodiment.

Figure 6:
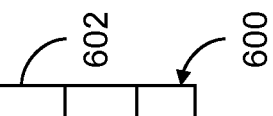
FIG. 6 is a table showing example tracking data, shown in the form of a look-up table, in accordance with one or more embodiments.

FIG. 6 shows example tracking data 600, in accordance with an embodiment. As shown in this embodiment, the tracking data 600 is provided in the form of a look-up table 602 having a column indicating beacon identifiers 116 and another column indicating spatial coordinates 136. Each row of the loop-up table indicates a pair of corresponding beacon identifier 116 and spatial coordinates 136. In this way, once a beacon identifier 116 is received from the radio frequency network 110, the tracking controller 118 finds the received beacon identifier 116 within the look-up table 602, and thereafter finds the spatial coordinates 136 associated thereto and then associate it to the device to be tracked. The tracking data 600 may not be in the form of a look-up table in some other embodiments.

Depending on the embodiment, the beacons may not all be similar to one another. For instance, in some embodiments, beacons that are meant to be positioned at intermediate positions along the radio frequency network may be provided in the form of intermediary beacons 700, an example of which is shown in FIG. 7, whereas beacons that are meant to terminate a given leaky cable, or be farther down the remote location, may be provided in the form of a termination beacon 800, an example of which is shown in FIG. 8.

Figure 7:
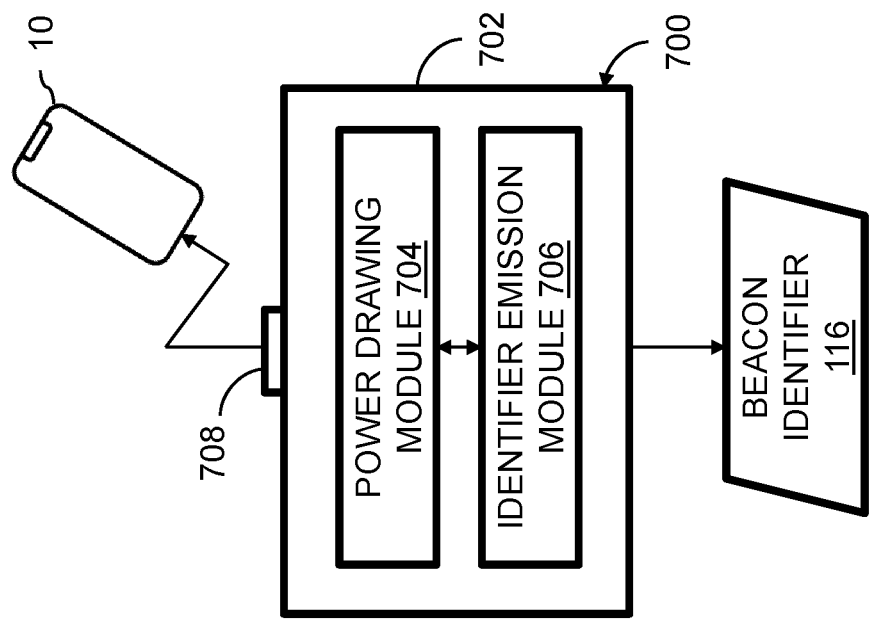
FIG. 7 is a schematic view of an example of an intermediary beacon, in accordance with one or more embodiments.

FIG. 7 shows an example intermediary beacon 700. As shown, the intermediary beacon 700 has a frame 702 enclosing a power drawing module 704 and an identifier emission module 706. The power drawing module 704 is configured to draw power from the radio frequency network as discussed above. The identifier emission module 706 is configured to locally emit a given identifier 116 which may be predetermined or set when the intermediary beacon 700 is manufactured. It is noted that the power drawing module 704 and the identifier emission module 706 can be embodied by a controller-type device having a processor and executable instructions stored on a memory accessible by the processor. As shown in this example, the intermediary beacon 700 can have one or more power supplying ports 708 for supplying power to one or more devices. For instance, the power supplying ports 708 can include ports of different types to power different communication devices 10 or any other external device (e.g., electrically powered tools, battery chargers, cameras), which may be convenient for workers working in the remote location. In some embodiments, the intermediary beacon 700, or any other beacon described herein, can be powered using a direct current power supplying component of minus 48 VDC at less than 100 mA or preferably less than 50 mA. However, should an external device be connected to one of the power supplying ports 708, electrical consumption can go up to about 2 A, in some specific embodiments.

Figure 8:
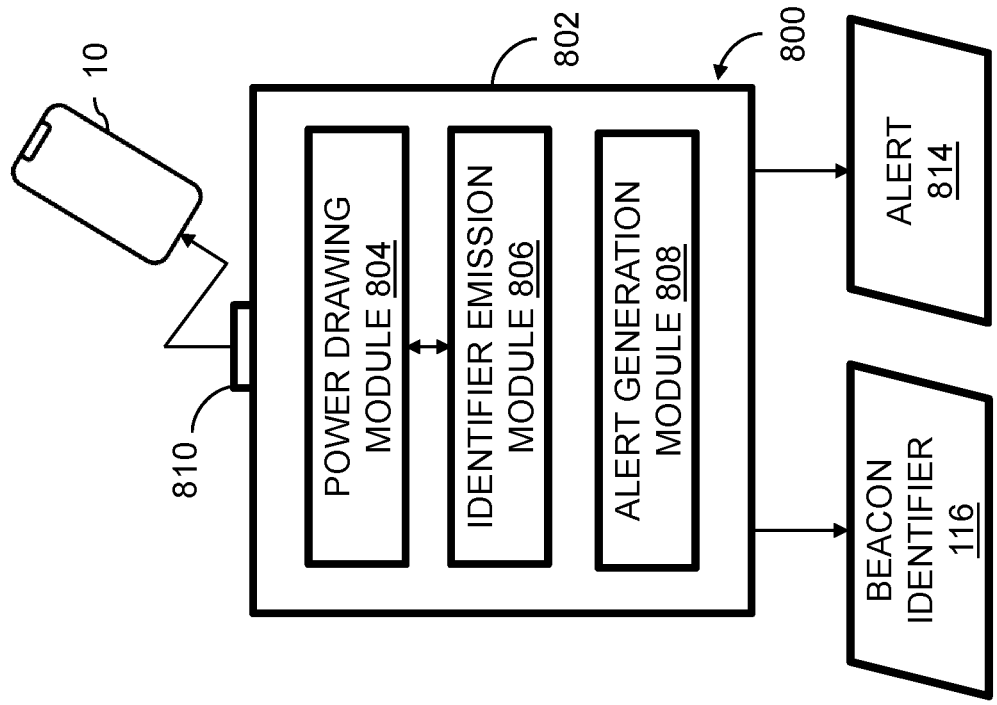
FIG. 8 is a schematic view of a termination beacon, in accordance with one or more embodiments.

FIG. 8 shows an example termination beacon 800. As depicted in this embodiment, the termination beacon 800 has a frame 802 enclosing a power drawing module 804, an identifier emission module 806 and also an alert generation module 808. Similarly to the intermediary beacon 700, the power drawing module 804 is configured to draw power from the radio frequency network whereas the identifier emission module 806 is configured to locally emit a given identifier 116 which may be predetermined or set when the termination beacon 800 is manufactured. In addition, the alert generation module 808 may be configured to monitor a status of the radio frequency network as perceived by the termination beacon 800. Should the status may not be deemed satisfactory, the alert generation module 808 can generate an alert 814 indicating that the radio frequency network is not satisfactory at that location. The alert 814 can be received by a nearby communication device which may forward it to the tracking controller, or any other type of controller, via the radio frequency network once that communication device is moved in a region of satisfactory radio frequency network status elsewhere within the remote location. The alert 814 may cause an indicator such as a visual or an auditory indicator to be activated. The alert 814 may be stored on a memory system and/or transmitted otherwise to an external network upon reception. The alert 814 may trigger maintenance of the radio frequency network, and more specifically, maintenance of the faulty region of the radio frequency network as monitored by the termination beacon 800. In some embodiments, the termination beacon 800 has a radio frequency termination load to avoid undesirable reflection of the radio frequency signal back along the leaky cable.

It is envisaged that the termination beacon 800 may be strategically used as an end of line module, specifically aimed at monitoring whether the radio frequency network is accessible at the corresponding end of line location. However, the termination beacon 800 may be used elsewhere within the remote location. For instance, the termination beacon 800 may be used at branch locations where one or more communication lines separate from one another.

Figure 9:
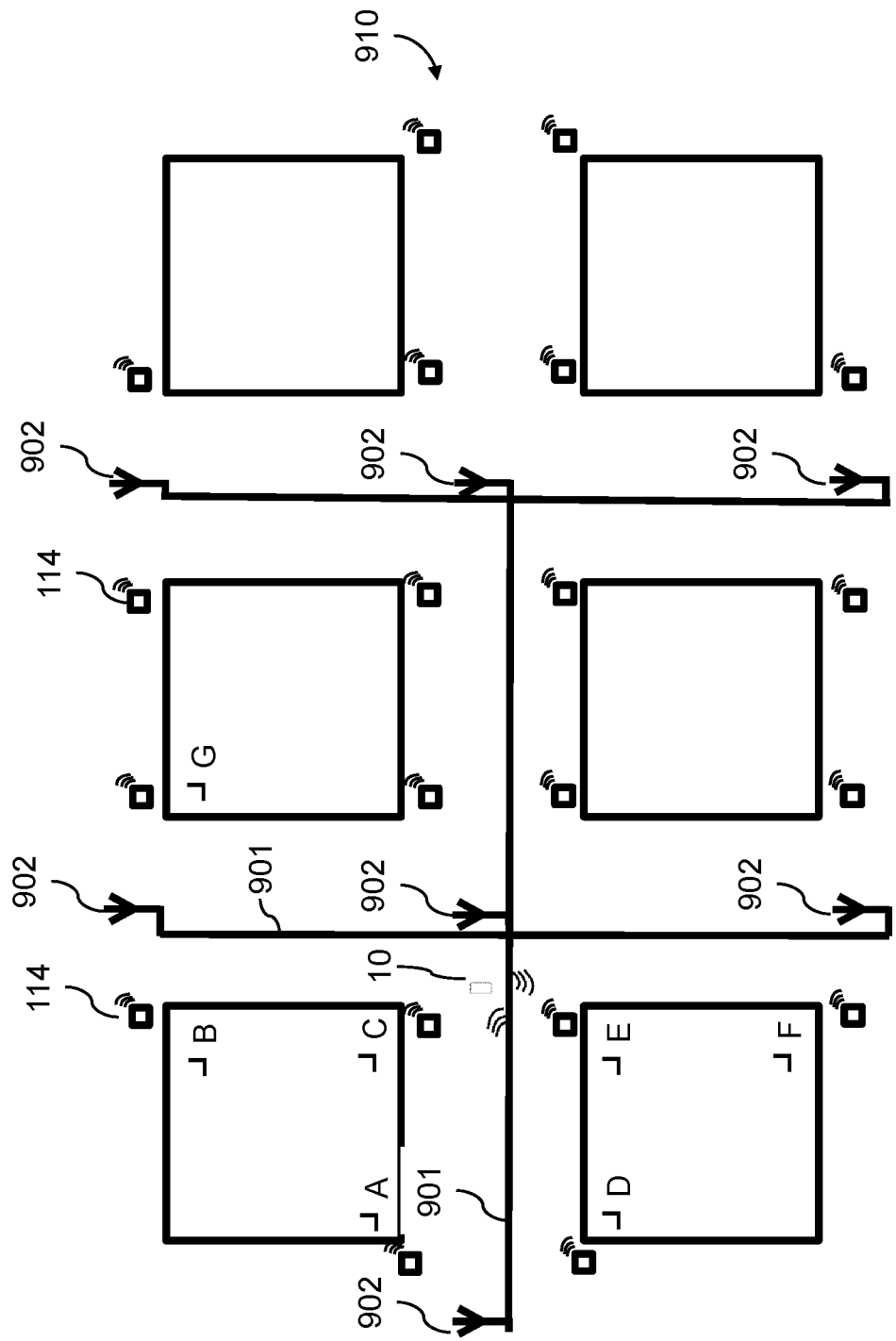
FIG. 9 is a top plan view of an example remote location, showing a radio frequency network having a plurality of antennas distributed throughout the remote location, in accordance with one or more embodiments.

FIG. 9 shows another implementation of a radio frequency network 910 in a remote location. In this specific embodiment, the radio frequency network 910 has a number of coaxial cable 901 carrying communication and powering signals to a number of radio frequency antennas 902 distributed within the remote location, with each of the radio frequency antennas 902 emitting the communication and powering signals therearound within a respective radiating range and receiving communication signals from surrounding communication devices 10. As shown, each of the beacons 114 are within range of one or more radiating ranges of at least some of the radio frequency antennas 902. This type of network architecture may be referred to as a distributed antenna system (DAS). It is envisaged that the radio frequency network described herein may be provided in the form of one or more leaky cables, one or more distributed antenna systems, and any combination thereof, depending on the embodiment.

Figure 10:
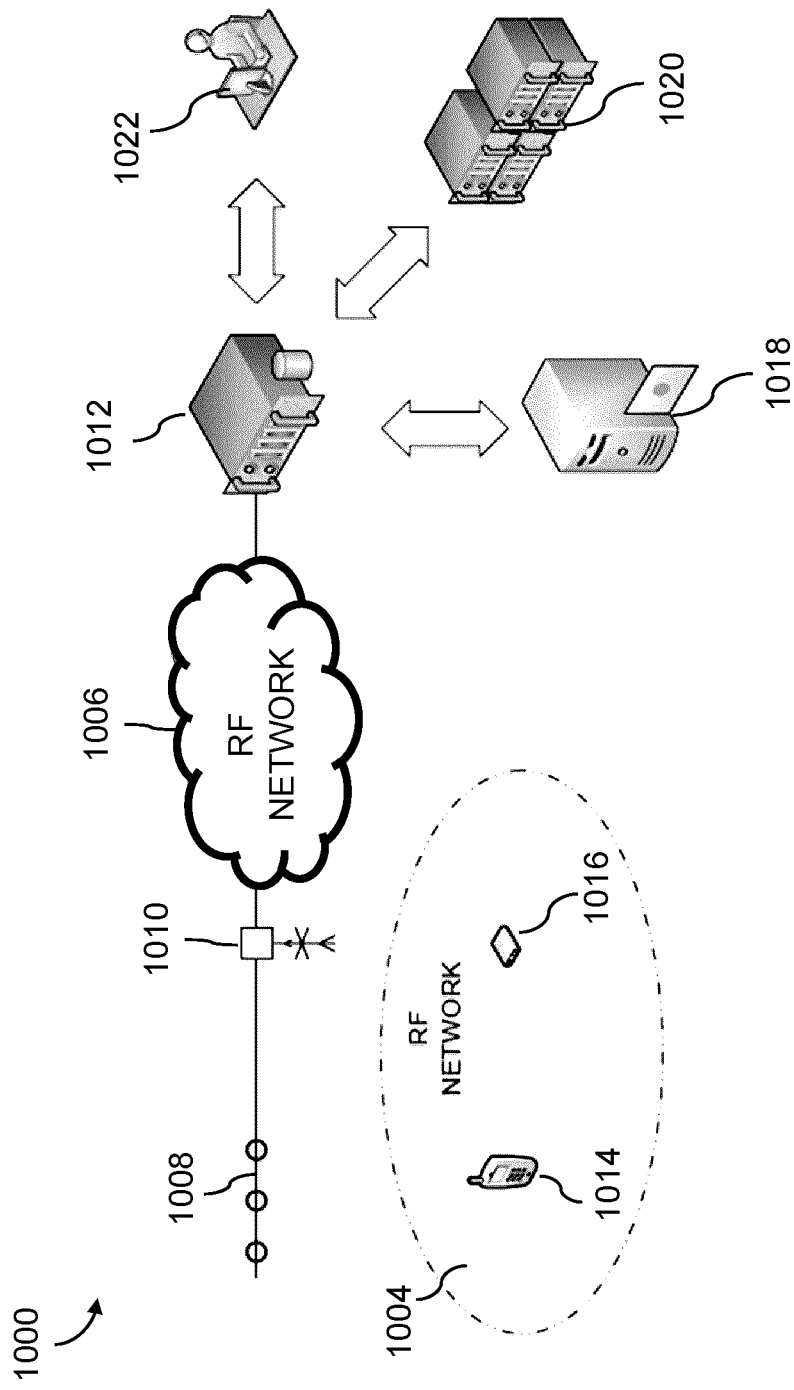
FIG. 10 is a schematic view of an example interior positioning system, showing the radio frequency provided in the form of a Long-Term Evolution (LTE) cable network, in accordance with one or more embodiments.

Referring now to FIG. 10, there is shown an interior positioning system 1000, according to one or more embodiments. The interior positioning system 1000 may also be referred to as a network tracking engine (NTE) or a real-time location system (RTLS). The interior positioning system 1000 is preferably used to track the position of at least one communication device 1004 in a remote location or in an underground location such as an underground mine in which traditional means for position tracking such as Global Positioning System (GPS) would not function as the signal would be weak or non-existent.

The interior positioning system 1000 includes a radio frequency network, preferably an LTE cable network 1006 (also referred to as an LTE transport network) including at least one leaky cable 1008 interspersed throughout the underground mine. In an alternate embodiment, an existing Wi-Fi network (not shown) may be used in place of the LTE cable network 1006, if available. A leaky cable can include a coaxial cable with gaps or slots in its outer conductor to allow radio signals to leak in or out of the cable along its entire length. As such, the LTE cable network 1006 can receive information transmitted by the at least one communication device 1004 to the at least one leaky cable 1008. Preferably, each mine worker working in the underground mine would carry a communication device 1004 so that their position may be tracked in real-time to ensure their safety and facilitate communication. Alternatively, communication devices 1004 may be installed in vehicles traveling through the mines. In another embodiment, the interior positioning system 1000 may be used to perform asset tracking with a non-geolocalized BLE beacon 1010.

Still referring to FIG. 10, a plurality of beacons 1010 are installed along the LTE cable network 1006 and are powered by the LTE cable network 1006. Alternatively, in another embodiment, each beacon 1010 is powered by an internal battery (not shown). This may be useful in case of a leaky link failure, for instance. Each beacon 1010 includes a unique beacon identifier and is configured to transit its unique beacon identifier to a nearby communication device 1004. In addition, the LTE cable network 1006 is connected to a data core 1012 which includes a tracking database (not shown) which includes information relating to the beacons 1010. In particular, the tracking database includes a unique set of geographical coordinates corresponding to each unique beacon identifier. As such, the LTE cable network 1006 can transmit a received beacon identifier from a communication device 1004 to the data core 1012, and thus the position of the communication device 1004 can be determined by cross referencing the received unique beacon identifier with a corresponding unique set of geographical coordinates. The beacons 1010 may be configured to each emit an uninterrupted signal, and thus as the communication device 1004 passes throughout the underground mine it may constantly receive unique beacon identifiers from nearby beacons 1010 and transmit this information to the data core 1012 so that its position may be constantly trackable in real-time. This is advantageous compared to battery powered beacons which broadcast their signals less frequently to conserve their battery life. In another embodiment, each beacon 1010 may be configured for bidirectional communication, allowing them to both send and receive signals.

In an embodiment, the beacons 1010 are installed every fifty meters along the LTE cable network 1006 and are used as fixed check points to allow for real-time tracking of the communication devices 1004. Stored in the tracking database is a combination of the unique beacon identifier and a set of geographical coordinates, for example of the (x, y, z) variety, for each individual beacon 1010. As such, a beacon 1010 may easily be relocated throughout the mine tunnels by simply updating its geographical coordinates in the tracking database. In an embodiment, the signal emitted by each beacon 1010 is a Bluetooth Low Energy (BLE) signal. As discussed above, each beacon 1010 is powered by the LTE cable network 1006, thus negating the need to provide batteries for the beacons 1010. In an embodiment, each beacon 1010 is IP69-rated to prevent possible damage from liquid and dust.

In some embodiments, each communication device 1004 is a commercial smartphone 1014 with both LTE and Bluetooth capabilities. A mobile application may be installed on the smartphone 1014 to allow the beacon 1010 to receive BLE signals from the beacons 1010 and establish various LTE communications, for example communicate with the LTE cable network 1006 by transmitting LTE signals to a leaky cable 1008. Thus, the mobile application may allow the smartphone 1014 to report unique beacon identifier's to allow for real-time positioning, read tracking sensors and establish LTE communication. The implementation of a commercial smartphone 1014 as a communication device 1004 is beneficial because most mine workers already own or are provided with a smartphone, so they would not have to carry around an additional device to become connected to the interior positioning system 1000. The mobile application may also be installed on other traditional consumer electronics with LTE and Bluetooth capabilities such as a tablet computer (not shown) so that they may act as a communication device 1004 for the purposes of the interior positioning system 1000.

In some embodiments, each communication device 1004 is a proprietary NTE device 1016 including both LTE/Wi-Fi (for example CAT-M1) and BLE chipsets so that it may communicate with both the beacons 1010 and the LTE cable network 1006. NTE device 1016 may also include a variety of sensors for sensing various data. Preferably, each NTE device 1016 is dimensioned so that it may be packaged in a body-worn device of a typical mine worker such as a cap lamp (not shown). As such, the mine workers would not have to carry around an additional device as the NTE device 1016 is integrated into their typical equipment. The NTE device may either be powered by the cap lamp's existing battery or include its own battery. In other embodiments, the NTE device may be integrated in another piece of traditional mine working equipment.

In some embodiments, the data core 1012 may include an application programming interface (API) to perform various functions. The API may monitor and receive regular reports regarding its positioning and collected sensor data at specific time intervals. In an embodiment, unless differently specified through this API, in the time period between these regular reports, each communication device 1004 will only send positioning and sensor data to the data core 1012 when one or both of them have changed, thus increasing power and information transmission efficiency. In another embodiment, each communication device will broadcast data to the data core 1012 regardless of if it's position changes.

The data core 1012 can be configured to store the tracking information in a reliable and efficient data structure. As such, in an embodiment, the data stored in the data core 1012 may be divided into two types: static data and dynamic data. Static data is manipulated less frequently than dynamic data and may be configured by external input through an API. Examples of static data stored in the data core 1012 may include configurations for the communication devices 1004, unique beacon identifiers, beacon coordinates, the number and identity of devices connected to the LTE cable network 1006 and any geographical references for location purposes. Conversely, dynamic data is reported by the communication devices 1004 and is considered read-only information and thus cannot be configured by external input. The data core 1012 receives the dynamic data from the communication devices 1004 at predetermined intervals for storage and indexing. Examples of dynamic data may include communication device 1004 status, positioning and sensor data.

It is anticipated that an operator may modify static data and read dynamic data by using an API command. Data from the data core 1012 may be shared through an API with, for example, a graphical user interface (GUI) 1018, an open platform communications network (OPC) 1020, a network operations center (NOC) 1022, as well as various monitoring systems (not shown). In addition, a variety of modules may be implemented to perform various functions. A base module (not shown) may handle the data core 1012's static and dynamic information as well as NTE infrastructure and history of LTE and BLE monitoring. For both data security and consistency purposes, the base module preferably is the only module that can directly access the data core 1012. An OPC 1020 module may translate the base module functions for external OPC clients. A GUI 1018 module may offer a web-based interface to interact with the base module. Finally, an external module (not shown) may allow for integrations with third party solutions. In an embodiment, the API is based on the REST architecture using the HTTPS transport protocol, TLS 1.2 cryptography protocol with certificate, and username and password authentication. Both Radius and LDAP integrations may be supported. In addition, the API software may be hosted in the same machine as the data core 1012 or may be hosted on a dedicated machine (not shown) to increase reliability and performance.

The interior positioning system 1000 may be integrated with external third-party software to meet a customer's various requirements. An external API module is thus dedicated to interoperability and to expose the API base module to industrial automation interaction. A variety of examples of such integration will now be discussed. An integration between the interior positioning system 1000 and various third party mining software packages can give to the customer a centralized web portal with a 3D real time positioning of workers and equipment, Internet of Things (IoT) sensory data and monitoring, industrial automation, production planning and overview, remote machine control, video streaming and a mobile application with underground navigation system. The interior positioning system 1000 may further feed a third party tracking solution. The interior positioning system 1000 may further be integrated with an emergency broadcast system to communicate any dangers directly to the communication devices 1004 over the LTE cable network 1006. A further integration with the OPC standard enables machine-to-machine interaction between the interior positioning system 1000 and the OPC devices 1020 for automation purposes. A custom interoperability design may add an NTE panel in the customer's NOC software 1022 to supervise, monitor and control both the LTE and BLE networks without changing the operation's work instruments. All of these examples may be designed to handle the interior positioning system 1000's infrastructure efficiently and with minimum impact on the customer's infrastructure and tools.

Advantageously, each beacon 1010 may be positioned between two sections of the leaky cable 1008 of the LTE cable network 1006 so that the beacon 1010 may draw its power from the leaky cable 1008 rather than require its own power source. In addition, each beacon 1010 may include its own power output port, for example a two-pin connector interface, to provide power to external devices such as a communication device 1004, a camera (not shown) or a sensor (not shown). In an embodiment, when firmware updates are available for the beacons 1010, they may be sent to the beacons through the LTE cable network 1006. In this embodiment, the power signal will be modulated to signal each beacon 1010 at first when an update is available, and then the firmware data will be transferred. Once the firmware update is complete, the power signal will return to its standard functional mode. In addition, the LTE signal on which each beacon receives power will preferably remain uninterrupted, whether it is being used to power the beacons 1010 or provide firmware updates. As such, any other devices using the LTE signal such as smartphones or other IoT devices will maintain an uninterrupted connection with the LTE cable network 1006 regardless of the beacons' 1010 operational modes.

With reference to the interior positioning system 1000, there is describe a method for tracking the position of at least one communication device 1004 in an underground mine. An LTE cable network 1006 is installed including at least one leaky cable 1008 interspersed throughout the underground mind, the LTE cable network 1006 connected to a data core 1012 including a tracking database. A plurality of beacons 1010 are installed along the LTE cable network 1006 and are each powered by the LTE cable network 1006 and each emit a unique beacon identifier. A unique set of geographical coordinates corresponding to each unique beacon identifier are stored in the tracking database of the data core 1012. The at least one communication device 1004 receives a unique beacon identifier from a nearby beacon 1010 and transmits the received unique beacon identifier to the data core 1012 via the LTE cable network 1006. Then, the position of the at least one communication device 1004 is determined by cross referencing the received unique beacon identifier with a corresponding unique set of geographical coordinates.

Figure 11:
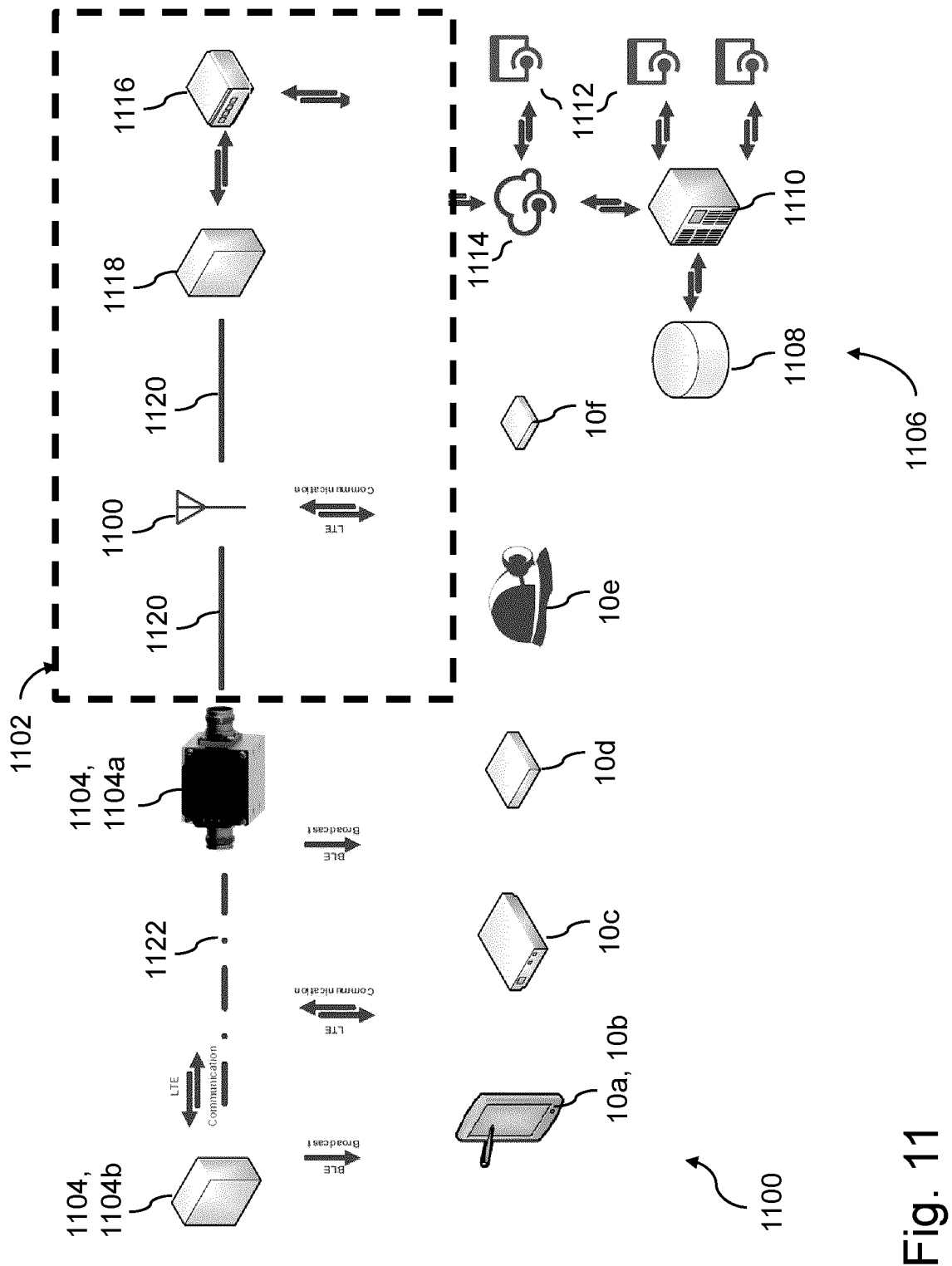
FIG. 11 is a schematic view of another example interior positioning system, showing a direct current injector injecting a direct current power supplying component to a communication signal transmitted by the radio frequency network, in accordance with one or more embodiments.

Referring now to FIG. 11, there is shown an interior positioning system 1100, according to another embodiment. As depicted, the interior positioning system 1100 has a radio frequency network 1102, a plurality of beacons 1104 powered by the radio frequency network 1102 and a network controller 1106.

As shown, the tracking controller 1106 has a core database 1108, a core processor 1110, software applications 1112 and network communication module 1114.

In this specific embodiment, the radio frequency network 1102 includes a remote radio unit (RRU) 1116, a DC injector 1118, and a combination of coaxial cable(s) 1120, radio frequency antennas 1122 propagating a radio frequency signal towards a remote location, and leaky cable(s) 1122 radiating the radio frequency signal locally within the remote location. The DC injector 1118 can be configured to inject a direct current power supplying component having an output ranging between minus 5 VDC and minus 60 VDC, and more preferably of minus 48 VDC at less than 7 A output. The DC injector 1118 can be connected using a radio frequency cable in an inline manner with respect to the RRU. The DC injector 1118 can have short-circuit protector, and be compliant with industry locking and tagging policies.

At some point within the remote location, the leaky cables 1122 and/or antennas are provided to radiate the radio frequency signal at strategic locations within the remote location. In this specific embodiment, the RRU 1116 generates a radio frequency signal modulated to carry information in a communication signal. Power may be incorporated to the radio frequency signal using the DC injector 1118, which incorporates a direct current power component to the radio frequency signal. For instance, the radio frequency signal may oscillated between predetermined voltage values at a frequency comprised within a given radio frequency bandwidth. The direct current power component may offset the voltage values by a given amount, thereby adding electrical energy to the radiated signal. In this specific embodiment, the direct current power component is used to power the beacons 1104 within the remote location.

In this embodiment, the beacons 1104, including intermediary beacon(s) 1104a and termination beacon(s) 1104b, are provided within the remote location. Each of these beacons 1104 are powered by the radio frequency signal radiated by the radio frequency network 1102, and emit corresponding beacon identifiers as discussed above. Different types of communication devices 10 including, but not limited to, Android and/or iOS powered smartphones 10a or electronic tablets 10b, LTE modems 10c and 10e, cap lamps 10e, or any other type of dedicated communication devices which may be body-mounted or asset-mounted. In some embodiments, communication between the communication devices 10 and the radio frequency network 1102 is performed using LTE communication whereas communication between the communication devices 10 and the beacons 1104 is performed using BLE communication. However, any other type of radio frequency communication can be used depending on the embodiments.

As can be understood, the examples described above and illustrated are intended to be exemplary only. For instance, in some embodiments, the radio frequency network broadcasts a communication signal and a powering signal. In some embodiments, the communication signal and the powering signal are independent from one another. However, in some other embodiments, the communication signal and the powering signal may be entangled to one another. It is envisaged that the expression "remote location" is meant to encompass any type of locations which may not be satisfactorily covered by traditional wireless network signals and/or GPS signals. The scope is indicated by the appended claims.

What is claimed is:

1. An interior positioning system for tracking spatial position of communication devices within a remote location, the interior positioning system comprising:
   a radio frequency network distributed through said remote location;
   a plurality of beacons spaced-apart from one another throughout said remote location and powered by said radio frequency network, each of said beacons locally emitting a corresponding beacon identifier which when received by a nearby communication device is communicated over said radio frequency network by said communication device; and
   a tracking controller being communicatively coupled to said radio frequency network, said tracking controller having a processor and a memory having stored thereon tracking data associating each of said beacon identifiers to respective spatial coordinates, and instructions that when executed by said processor perform the steps of: receiving said beacon identifier communicated over said radio frequency network by said communication device, and determining spatial coordinates of said communication device by cross referencing said received beacon identifier to said tracking data, said radio frequency network having a communication link carrying a communication signal, and a powering link supplying electrical power to said beacons.

2. The interior positioning system of claim 1 wherein said beacons are battery-less.

3. The interior positioning system of claim 1 wherein said powering link includes a power injector injecting said electrical power to said communication signal.

4. The interior positioning system of claim 3 wherein said power injector injects a direct current power supplying component to said communication signal.

5. The interior positioning system of claim 4 wherein said direct current power supplying component includes a negative tension.

6. The interior positioning system of claim 5 wherein said negative tension is below at least minus 5 VDC.

7. The interior positioning system of claim 1 wherein at least one of said beacons has a power supplying port for supplying power to at least one of said communication device an external device.

8. The interior positioning system of claim 1 wherein said beacons have an operating software being updatable via said radio frequency network.

9. The interior positioning system of claim 8 wherein said updating is performed by modulating a power supplied by said radio frequency network.

10. The interior positioning system of claim 1 wherein said radio frequency network has one or more leaky cables interspersed throughout said remote location.

11. The interior positioning system of claim 1 wherein said radio frequency network has one or more radio frequency antennas distributed within said remote location.

12. The interior positioning system of claim 10 wherein at least a given one of said beacons has a processor and a memory having stored thereon instructions that when executed by said processor perform the steps of: upon detecting that said given beacon is no longer in communication with said radio frequency network, generating an alert which when received by a nearby communication device is communicated over said radio frequency network by said communication device.

13. A method of tracking position of communication devices within a remote location having a radio frequency network distributed therethrough, the method comprising:
   using a plurality of beacons spaced-apart within said remote location, drawing power from said radio frequency network and, using said drawn power, locally transmitting corresponding beacon identifiers nearby;

upon a communication device receiving at least one of said locally transmitted beacon identifiers, communicating said received beacon identifier via said radio frequency network, said radio frequency network communicates with said beacons by modulating said power; and using a tracking controller,
accessing tracking data associating each of said beacon identifiers to respective spatial coordinates;
receiving said beacon identifier communicated over said radio frequency network by said communication device; and
determining spatial coordinates of said communication device by cross referencing said received beacon identifier to said tracking data.

14. The method of claim 13 wherein said radio frequency network has a communication signal and a powering signal superposed to said communication signal.

15. The method of claim 14 wherein said powering signal includes a direct current power supplying component, said direct current power supplying component having a negative tension.

16. The method of claim 13 further comprising, upon detecting that a given one of said beacons is no longer in communication with said radio frequency network, generating an alert which when received by a nearby communication device is communicated over said radio frequency network by said communication device.

17. The method of claim 13 wherein upon communicating said received beacon identifier via said radio frequency network, said communication device further communicating a device identifier identifying said communication.

18. The method of claim 13 wherein upon communicating said received beacon identifier via said radio frequency network, said communication device further communicating sensor data indicative of data generated by a sensor of at least one of said communication device and an external device communicatively coupled to said communication device.

19. An interior positioning system for tracking spatial position of communication devices within a remote location, the interior positioning system comprising:
a radio frequency network distributed through said remote location;
a plurality of beacons spaced-apart from one another throughout said remote location and powered by said radio frequency network, each of said beacons locally emitting a corresponding beacon identifier which when received by a nearby communication device is communicated over said radio frequency network by said communication device; and
a tracking controller being communicatively coupled to said radio frequency network, said tracking controller having a processor and a memory having stored thereon tracking data associating each of said beacon identifiers to respective spatial coordinates, and instructions that when executed by said processor perform the steps of: receiving said beacon identifier communicated over said radio frequency network by said communication device, and determining spatial coordinates of said communication device by cross referencing said received beacon identifier to said tracking data, wherein said beacons have an operating software updatable via said radio frequency network, said updating performed by modulating a power supplied by said radio frequency network.

20. An interior positioning system for tracking spatial position of communication devices within a remote location, the interior positioning system comprising:
a radio frequency network distributed through said remote location, said radio frequency network including a leaky cable;
a plurality of beacons spaced-apart from one another throughout said remote location and powered by said radio frequency network, each of said beacons locally emitting a corresponding beacon identifier which when received by a nearby communication device is communicated over said radio frequency network by said communication device, at least some of said beacons drawing power from said leaky cable; and
a tracking controller being communicatively coupled to said radio frequency network, said tracking controller having a processor and a memory having stored thereon tracking data associating each of said beacon identifiers to respective spatial coordinates, and instructions that when executed by said processor perform the steps of: receiving said beacon identifier communicated over said radio frequency network by said communication device, and determining spatial coordinates of said communication device by cross referencing said received beacon identifier to said tracking data.

21. The interior positioning system of claim 20 wherein said plurality of beacons are wiredly connected to said leaky cable.

22. The interior positioning system of claim 21 wherein said power is drawn from a DC power supplying component of said leaky cable.

* * * * *